(12) United States Patent
Park

(10) Patent No.: US 6,181,669 B1
(45) Date of Patent: *Jan. 30, 2001

(54) APPARATUS FOR ADJUSTING A TILT OF A DISC LOADED ON A TURN TABLE

(75) Inventor: Hee-deuk Park, Sungnam (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/001,461

(22) Filed: Dec. 31, 1997

(30) Foreign Application Priority Data

Jun. 13, 1997 (KR) .................................................. 97-24429

(51) Int. Cl.[7] .............................. G11B 17/30; G11B 23/00
(52) U.S. Cl. ............................................................ 369/219
(58) Field of Search ........................... 369/219, 263; 360/98.07, 99.08, 99.04

(56) References Cited

U.S. PATENT DOCUMENTS

| | | | |
|---|---|---|---|
| 3,927,252 | * 12/1975 | Polley | 369/111 |
| 4,506,857 | * 3/1985 | Hara et al. | 248/655 |
| 5,347,507 | * 9/1994 | Kuhn | 369/263 |
| 6,005,836 | * 12/1999 | Choi | 369/219 |

FOREIGN PATENT DOCUMENTS

| 2085635 | * 4/1982 | (GB) . |
|---|---|---|
| 10-134359 | 5/1998 | (JP) . |

* cited by examiner

Primary Examiner—George J. Letscher
(74) Attorney, Agent, or Firm—Staas & Halsey LLP

(57) ABSTRACT

A tilt adjusting apparatus includes a deck base having a loading ring, a bracket formed with a slot, the bracket including a spindle motor for rotating a disc and a turn table on which the disc is loaded, a supporting part disposed between the loading ring and the bracket for horizontally supporting the disc and the turn table by supporting the bracket, and a tilt adjusting part rotatably mounted to the deck base for adjusting a tilt of the disc. The bracket is easily suppoted to the deck base to be horizontal by increasing a supporting area of the tilt adjusting part. Both a radial tilt and a tangential tilt of the turn table and the disc can be easily adjusted.

18 Claims, 4 Drawing Sheets

APPARATUS FOR ADJUSTING A TILT OF A DISC LOADED ON A TURN TABLE

BACKGROUND OF THE INVENTION

1. Field of the Invention

The present invention relates to an apparatus for adjusting a tilt of a disc, and more particularly to an apparatus for easily adjusting a tilt of a disc which is loaded on a turn table of a disk recording/reproducing device and rotated at high speed.

2. Description of the Related Art

In general, a disc is used as a recording medium for recording information on, and reproducing information therefrom and leg, spiral or concentric tracks which contain the information. The information recorded on the disc is reproduced using a pick-up feeding means including a motor and a plurality of gear trains which are driven and rotated by the motor, and an optical pick-up device which is linearly moved by the pick-up feeding means in a radial direction of the disc.

A guide device for guiding an optical pick-up device which is moved along the radial direction of a disc D (not shown) is shown in FIG. 1. The guide device includes two guide shafts 12 and 12' which are fixed to a deck base 10 to be parallel with a horizontal axis of the optical pick-up device by bushes 14. A pick-up base 16 on which the optical pick-up device is mounted, is movably coupled to guide shafts 12 and 12'.

Supporting members 18 such as bosses and the like, protrude from on upper surface of the deck base 10 to support disc rotating means shown in FIGS. 1 and 2 for rotating the disc D at a linear velocity. The disc rotaing means includes a turn table 20 on which a nonmagnetic portion of the disc D rests, and a spindle motor 22 rotating shaft. An upper portion of the rotating shaft is coupled to the turn table 20.

The spindle motor 22 is fixed to a bracket 24 which contacts upper surface of supporting members 18, and the bracket 24 is fixed to the supporting members 18 by three fixing screws 28 to be spaced apart and fastened to the deck base 10. The bracket 24 is formed with two position setting holes 24a into which position setting pins 10a are respectively inserted.

The conventional disc rotating means constructed as above is fixed to the deck base 10 and operates as follows. First, the disc rotating means is mounted to the deck base 10 by which position setting pins 10a are inserted into the respective position setting holes 24a which protroded from the deck base 10. Then, the bracket 24 is fixed to the deck base 10 by means of the coupling fixing screws 28 with supporting members 18. The fixing screws 28 are arranged at a predetermined angle with respect to each other. At this time, the bracket 24 supports the spindle motor 22 and the turn table 20 coupled to the spindle motor 22 by contacting the upper portions the supporting members 18.

After this, the disc D is loaded on the upper surface of the turn table 20 and is rotatiled at a high velocity by rotating the power of the spindle motor 22. At the same time, a pick-up base 16 moves in a radial direction of the disc D along the guide shafts 12, 12' which are fixed to be parallel with the horizontal shaft of the optical pick-up device so that the optical pick-up device records the information on recording pits and/or reproduces the information therefrom.

In the conventional disc rotating device, however, since the bracket on which the spindle motor is mounted is fixed to the upper portion of the supporting member using a plurality of fixing screws, the contact are of the supporting members is small so that the supporting members cannot properly horizontally support the bracket. As a result the disc on the turn table is undesirably tilted. Moreover, since there is no a tilt adjusting means for adjusting the radial and tangential tilt of tile disc, the laser beam emitted from the optical pick-up device cannot accurately be focused on the record pits on the disc.

SUMMARY OF THE INVENTION

The present invention has been made to overcome the above described problems of the related art. Accordingly, it is an object of the present invention to provide an apparatus for easily adjusting a radial and a tangential tilt of a turn table and a disc loaded on the turn table, the apparatus being capable of horizontally mounting a disc rotating device on a deck base by means of expanding a supporting area of a bracket.

To accomplish the above and the other objects of the present invention, the present invention provides an apparatus comprising a deck base having a loading ring, a bracket formed with a slot, the bracket including a spindle motor for rotating tile disc and a turn table on which the disc is loaded, a supporting part disposed between the loading ring and the bracket for horizontally supporting the disc and the turn table by supporting the bracket, and a tilt adjusting part rotatably mounted to the deck base for adjusting a tilt of the disc.

According to an embodiment of the present invention, the supporting part includes a contacting portion for contacting the loading rin and a placing portion on which the bracket is placed the contacting portion having a semispherical shape and being integrally formed with the placing portion.

Moreover, the tilt adjusting part includes a tilt cam rotatably mounted to the deck base for adjusting a first directional tilt of the disc, and in eccentric cam rotatably mounted to the deck base for adjusting a second directional tilt of the disc, the tilt cam having an inclined surface formed at upper end thereof an upper portion the eccentric cam penetrating through the slot and contacting the slot.

There are some advantages when the bracket is horizontally supported to the deck base by increasing a supporting area of the cams. The radial and tangential tilts generated by inclination of the turn table and the disc can be easily adjusted.

BRIEF DESCRIPTION OF THE DRAWINGS

The above object and other advantages of the present invention will become more apparent by describing in detail a preferred embodiment thereof with reference to the attached drawings in which.

DESCRIPTION OF THE PREFERRED EMBODIMENT

Figure 3:
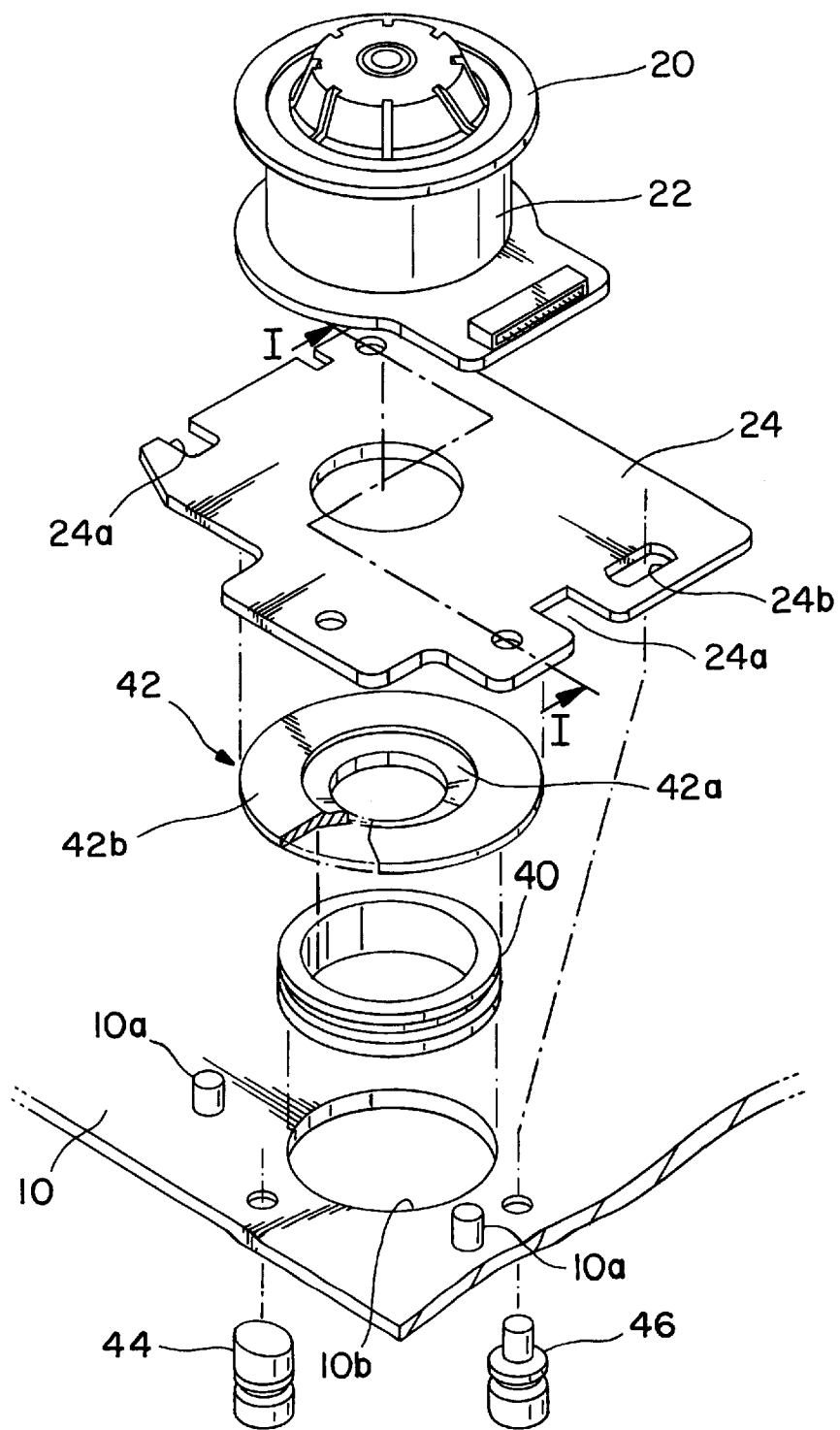
FIG. 3 is an exploded perspective view showing a tilt adjusting apparatus according to the preferred embodiment of the present invention.
Figure 4:
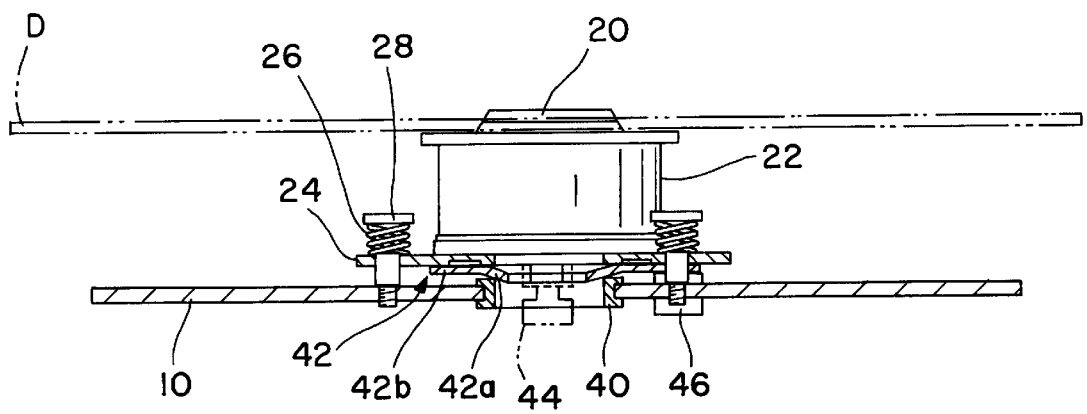
FIG. 4 is a cross-sectional view taken along line I—I in FIG. 3.

Referring to FIGS. 3 and 4, a preferred embodiment of the present invention will be described.

A deck base 10 is formed with a penetrated hole 10b, and a circular loading ring 40 is integrally formed with an inner circumference of the penetrated hole 10b by molding. At an upper side of the deck base 10, a disc rotating the device for rotating disc D, i.e., a spindle motor 22 and a turn table 20 coupled with the spindle motor 22 are installed. The spindle motor 22 and turn table 20 are mounted to a bracket 24.

A supporting part 42 for supporting the disc and the disc rotating device to be horizontal is disposed under the bracket 24. The supporting part 42 has a contacting portion 42a and a placing portion 42b. The contacting portion 42a having a curved (recessed or somewhat concave) shape contacts the loading ring 40 by points and has a predetermined radius of curvature. The placing portion 42b closely contacts a lower side of the bracket 24 and is extended from the portion 42a. The contacting portion 42a is integrally formed with the placing portion 42b.

Figure 1:
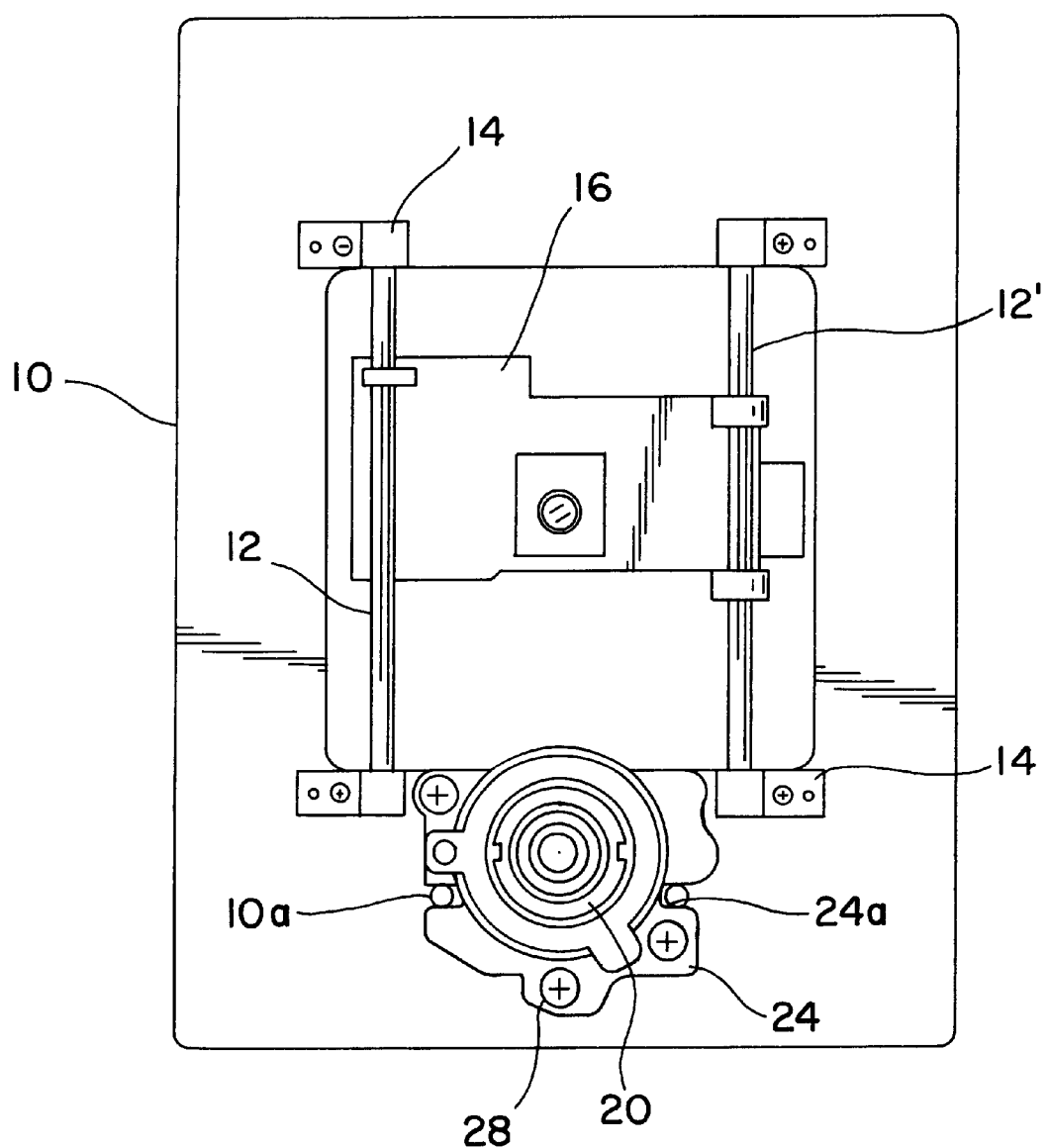
FIG. 1 is a plan view showing a conventional optical pick-up device.
Figure 2:
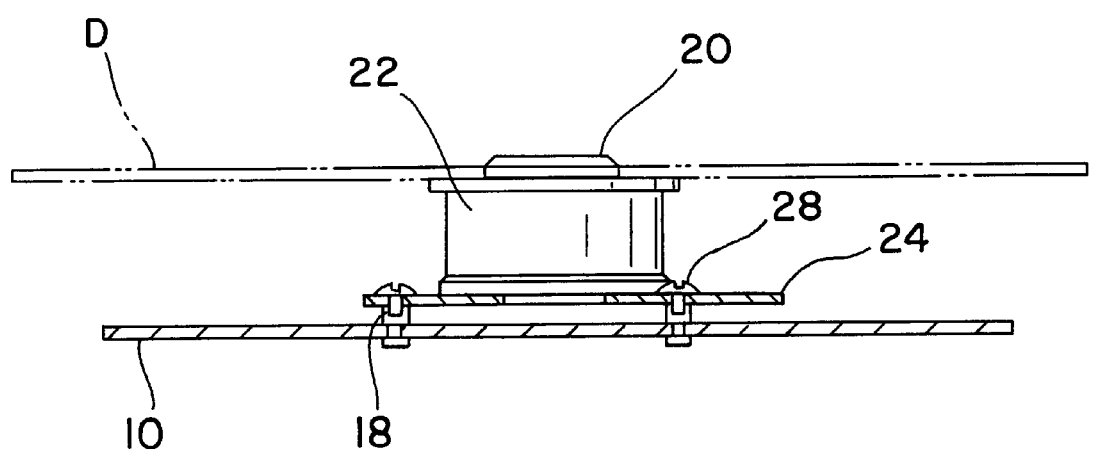
FIG. 2 is a sectional view showing a disc rotating device of the optical pick-up in FIG. 1.

A tilt adjusting part for adjusting tilt of disc D is coupled to the deck base 10. The tilt adjusting part comprises a tilt cam 44 and an eccentric cam 46. Here, it is assumed the direction that is extended from the center of the a rotating shaft of spindle motor 22 to the center of the tilt cam 44 is a radial direction and a direction that is extended from the center of the rotating shaft of the spindle motor 22 to the center of the eccentric cam 46 is defined as a tangential direction. The radial direction is a direction in which the pickup is moved across tracks of the disk D, and the tangential direction is perpendicular to the radial direction. For example, the pickup base 16 shown in FIG. 1 moves in the radial direction. Thus, the tilt cam 44 adjusts the radial tilt of the disc D and the eccentric cam adjusts the tangential tilt of the disk D. The tilt cam 44 is disposed at a predetermined angle, preferably about 90 degrees to the eccentric cam 46 with respect to the center of the rotating shaft of the spindle motor 22. By rotation of the tilt cam 44 and contact of the inclined surface of the tilt cam 44 with the bracket 24, the bracket 24 is raised or lowered so that the horizontality of the disc D in the radial direction is adjusted.

The tilt cam 44 is rotatably mounted to the deck base 10, has an inclined surface formed at an upper end thereof and adjusts a radial tilt of the disc D so that the radial tilt of disc D is adjusted by rotation of the tilt cam 44. The eccentric cam 46 for adjusting the tangential tilt of the disc D is rotatably mounted to the deck base 10 and an upper position or eccentric cam 46 penetrates a slot 24b formed behind a position setting hole 24a(the slot 24b being formed at a rear portion of the position setting hole 24a on the bracket 24). When the eccentric cam 46 is rotated, the upper portion 46a pushes or pulls the bracket 24 in the tangential direction. Thus, the bracket is raised or lowered by the contacting portion 42a of the supporting part 42 so that the horizontality of the disc D in the tangential direction is adjusted.

Figure 5:
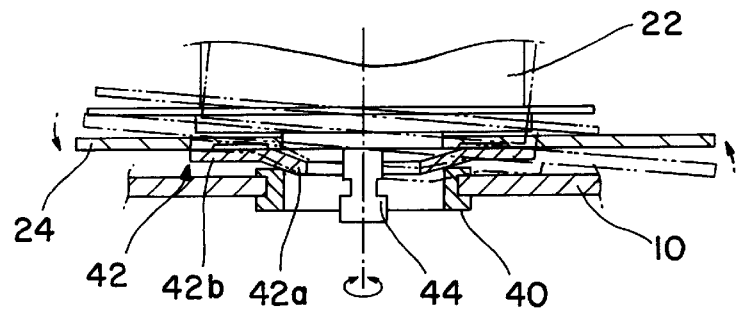
FIG. 5 is a cross-sectional view illustrating the operation of the tilt adjusting apparatus according to the preferred embodiment of the present invention.

Referring to FIG. 5, the operation of the tilt adjusting apparatus constructed as above according to the present invention will be described as follows.

After the spindle motor 22 coupled with the turn table 20 is installed on the deck base 10 by inserting position setting pin 10a protruded from deck base 10 into the position setting hole 24a, fixing screws 28 surrounded by springs 26 are screwed on the bracket 24 predetermined angles with respect to each other around the center of the rotating shaft of the spindle motor 22. Then the bracket 24 is mounted to the deck base 10.

As supporting part 42 is placed on the upper portion of the loading ring 40 formed at the inner circumference of the penetrated hole 10b of the deck base 10, the spindle motor 22 and turn table 20 which are fixed on bracket 24 can be supported horizontally. Thus, the radial and tangential tits of the disc and the disc rotating device are prevented.

After this, the optical pick-up part moves along guide shafts 12 and (12' (see FIG. 1) in a relief direction of the disc D which is rotated by the spindle motor 22 so that the optical pick-up part records the information on the recording track of the disc D and/or reproduces the information from the recording track.

Meanwhile, if the laser beam is not focused on the recording pits of the disc D due to the disc D loaded on turn table 20 being tilted in the radial and/or tangential direction in excess of a predetermined angle, a reflected signal from the recording pits is not proper. At this time, the rotation of the tilt cam 44 raises or lowers bracket 24 slightly so that the radial tilt of the disc D is adjusted.

Moreover, if the eccentric cam 46 penetrating the deck base 10 is rotated, the upper portion of the eccentric cam 46 which contacts the inner side of the slot 24b moves the bracket 24 in the tangential direction so that the tangential tilts of the disc D and the disc rotating part are adjusted. At this time, the supporting part 42 slidably moves so that the horizontaility of the tilted disc can be easily adjusted.

According to the tilt adjusting apparatus of the present invention as described above, the bracket on which the disc rotating device is mounted is horizontally installed to the deck base by increasing a supporting area of the cams which are in contact with the bracket. The radial and tangential tilts generated by inclination of the turn table and the disc can be easily adjusted.

The present invention was described above based on the preferred embodiment, but the present invention is not limited to the preferred embodiment, and various changes and modifications can be added without departing from the scope of the present invention.

What is claimed is:

1. An apparatus for adjusting a tilt of a disc, comprising:
   a deck base having a loading ring;
   a bracket formed with a slot, the bracket including a turn table on which the disc is to be loaded and a spindle motor;
   supporting means disposed between the loading ring and the bracket, to horizontally support the turn table and the disc by supporting the bracket; and
   adjusting means rotatably mounted to the deck base to adjust the tilt of the turntable and the disc.

2. The apparatus as claimed in claim 1, wherein the supporting means comprises:
   a contacting portion to contact the loading ring; and
   a placing portion on which the bracket is placed;
   wherein the contacting portion has a curved shape and is integrally formed with the placing portion.

3. The apparatus as claimed in claim 2, wherein the adjusting means comprises:
   a tilt cam rotatably mounted to the deck base to adjust a first directional tilt of the turn table and the disc, and having an inclined surface formed at an end thereof; and
   an eccentric cam rotatably mounted to the deck base to adjust a second directional tilt of the turn table and the disc, and having an upper portion thereof which penetrates through and contacts the slot.

4. The apparatus as claimed in claim 3, further comprising:
   fixing screws having respective heads and passing through the bracket and into the deck base; and springs respectively formed between the heads and the bracket, to bias the bracket toward the deck base.

5. The apparatus as claimed in claim 4, wherein the inclined surface of the tilt cam presses against a side of the bracket opposite to that of the springs, to adjust the first directional tilt through a rotation of the tilt cam.

6. The apparatus as claimed in claim 2, further comprising:
fixing screws having respective heads and passing through the bracket and into the deck base; and
springs respectively formed between the heads and the bracket, to bias the bracket toward the deck base.

7. The apparatus as claimed in claim 1, wherein the adjusting means comprises:
a tilt cam rotatably mounted to the deck base to adjust a first directional tilt of the turn table and the disc, and having an inclined surface formed at an end thereof; and
an eccentric cam rotatably mounted to the deck base to adjust a second directional tilt of the turn table and the disc, and having an upper portion thereof which penetrates through and contacts the slot.

8. The apparatus as claimed in claim 7, further comprising:
fixing screws having respective heads and passing through the bracket and into the deck base; and
springs respectively formed between the heads and the bracket, to bias the bracket toward the deck base.

9. An apparatus to adjust an orientation of a turntable on which a disc is to be set, comprising:
a deck base;
a bracket having a spindle motor connected to the turntable, to rotate the turntable; and
a tilt mechanism to control a tilt of the bracket, spindle motor and turntable relative to the deck base, wherein said tilt mechanism controls the tilt of the bracket, spindle motor and turntable in a first direction and a second direction different from the first direction.

10. An apparatus to adjust an orientation of a turntable on which a disc is to be set, comprising:
a deck base;
a bracket having a spindle motor connected to the turntable, to rotate the turntable; and
a tilt mechanism to control a tilt of the bracket, spindle motor and turntable relative to the deck base, wherein said tilt mechanism comprises
a loading ring formed in the deck base,
a support part including
a curved portion extending into the loading ring; and
a placing part fixedly connected to said curved portion and supporting a surface of the bracket opposite to that to which the spindle motor is connected, and
an adjustment mechanism to bias the deck base, causing the curved portion to slide relative to the loading ring.

11. The apparatus as claimed in claim 10, wherein the adjustment mechanism comprises:
a tilt cam rotatably mounted to the deck base and having an end in contact with the bracket, wherein rotation of the tilt cam causes the end to bias a portion of the deck base, thereby controlling the tilt of the bracket, spindle motor and turntable.

12. The apparatus as claimed in claim 11, further comprising:

biasing means to bias the bracket toward the deck base;
wherein the tilt cam biases the portion of the deck base away from the deck based upon an amount of the rotation of the tilt cam.

13. The apparatus as claimed in claim 12, wherein the biasing means comprises:
fixing screws having respective heads and passing through the bracket and into the deck base; and
springs respectively formed between the heads and the bracket, to bias the bracket toward the deck base.

14. The apparatus as claimed in claim 13, wherein the adjustment mechanism comprises:
a slot formed in the bracket; and
an eccentric cam rotatably mounted to the deck base and having a protrusion eccentric to an axis of rotation of the eccentric cam and extending into the slot;
wherein rotation of the eccentric cam causes the protrusion to bias the deck base, thereby controlling the tilt of the bracket, spindle motor and turntable in a second direction different from a direction of the tilt of the bracket, spindle motor and turntable caused by the rotation of the tilt cam.

15. The apparatus as claimed in claim 10, wherein the adjustment mechanism comprises:
a slot formed in the bracket; and
an eccentric cam rotatably mounted to the deck base and having a protrusion eccentric to an axis of rotation of the eccentric cam and extending into the slot;
wherein rotation of the eccentric cam causes the protrusion to bias the deck base, thereby controlling the tilt of the bracket, spindle motor and turntable.

16. The apparatus as claimed in claim 11, wherein the adjustment mechanism comprises:
a slot formed in the bracket; and
an eccentric cam rotatably mounted to the deck base and having a protrusion eccentric to an axis of rotation of the eccentric cam and extending into the slot;
wherein rotation of the eccentric cam causes the protrusion to bias the deck base, thereby controlling the tilt of the bracket, spindle motor and turntable in a second direction different from a direction of the tilt of the bracket, spindle motor and turntable caused by the rotation of the tilt cam.

17. The apparatus as claimed in claim 16, wherein the tilt cam forms a first line with a center of rotation of the spindle motor which is substantially perpendicular to a second line formed by the eccentric cam and the center of rotation of the spindle motor.

18. An apparatus to adjust an orientation of a turntable on which a disc is to be set, comprising:
a deck base;
a bracket having a spindle motor connected to the turntable, to rotate the turntable; and
a tilt mechanism to control a tilt of the bracket, spindle motor and turntable relative to the deck base, wherein said tilt mechanism comprises
a first cam rotatably mounted to the deck base, to bias the bracket to tilt the bracket, spindle motor and turntable in a first tilt direction, and
a second cam rotatably mounted to the deck base, to bias the bracket to tilt the bracket, spindle motor and turntable in a second tilt direction different from the first tilt direction.

* * * * *

UNITED STATES PATENT AND TRADEMARK OFFICE
CERTIFICATE OF CORRECTION

PATENT NO.    : 6,181,669 B1
DATED         : January 30, 2001
INVENTOR(S)   : Hee-deuk Park It is certified that error appears in the above-identified patent and that said Letters Patent is hereby corrected as shown below:

Title page,
Item [57], ABSTRACT,
Line 9, change "suppoted" to -- supported --;

Column 4,
Line 41, after "motor" insert -- to rotate the turntable and the disc --.

Signed and Sealed this

Eighth Day of January, 2002

*Attest:*

*Attesting Officer*

JAMES E. ROGAN
*Director of the United States Patent and Trademark Office*